United States Patent [19]

Miyazaki et al.

[11] Patent Number: 5,551,007
[45] Date of Patent: Aug. 27, 1996

[54] METHOD FOR CONTROLLING MULTIPLE COMMON MEMORIES AND MULTIPLE COMMON MEMORY SYSTEM

[75] Inventors: Yoshihiro Miyazaki, Hitachi; Yoshiaki Takahashi, Mito; Manabu Araoka, Hitachi; Soichi Takaya, Hitachi; Hiroaki Fukumaru, Hitachi, all of Japan

[73] Assignee: Hitachi, Ltd., Tokyo, Japan

[21] Appl. No.: 121,449

[22] Filed: Sep. 16, 1993

Related U.S. Application Data

[63] Continuation of Ser. No. 585,234, Sep. 20, 1990, abandoned.

[30] Foreign Application Priority Data

Sep. 20, 1989 [JP] Japan ................................. 1-243617

[51] Int. Cl.⁶ .................................................. G06F 13/40
[52] U.S. Cl. ........................... 395/47.5; 395/485; 395/413
[58] Field of Search ...................... 395/400 MS, 425 MS, 395/446, 449, 475, 413

[56] References Cited

U.S. PATENT DOCUMENTS

| | | | |
|---|---|---|---|
| 4,240,143 | 12/1980 | Besemer et al. | 395/325 |
| 4,622,631 | 11/1986 | Frank et al. | 364/200 |
| 4,811,216 | 3/1989 | Bishop et al. | 395/425 |
| 4,823,259 | 4/1989 | Aichelmann et al. | 395/449 |
| 4,885,680 | 12/1989 | Anthony et al. | 364/200 |
| 4,959,777 | 9/1990 | Holman, Jr. | 364/200 |
| 4,991,081 | 2/1991 | Bosshart | 364/200 |
| 5,008,813 | 4/1991 | Crane et al. | 364/200 |
| 5,029,070 | 7/1991 | McCarthy et al. | 364/200 |
| 5,043,886 | 8/1991 | Witek et al. | 364/200 |

FOREIGN PATENT DOCUMENTS

| | | |
|---|---|---|
| 0345738A2 | 12/1989 | European Pat. Off. . |
| 0369265A2 | 5/1990 | European Pat. Off. . |
| 3610155A1 | 10/1987 | Germany . |
| 3736169A1 | 3/1989 | Germany . |
| 61-9738 | 1/1986 | Japan . |
| 62-100858 | 5/1987 | Japan . |

*Primary Examiner*—Reba I. Elmore
*Attorney, Agent, or Firm*—Antonelli, Terry, Stout & Kraus

[57] ABSTRACT

A multiple common memory system is provided in which at least three CPUs share at least two common memories each storing one and the same content. Each of the first and second CPUs contains a respective one of the two common memories, and each of the first and second CPUs has an arrangement to access the common memory therein at the time of requesting a read access to a common memory. Other CPUs in the system do not contain common memories, but do include arrangements to access the common memory of the first or second CPU at the time of requesting a read access to a common memory.

6 Claims, 18 Drawing Sheets

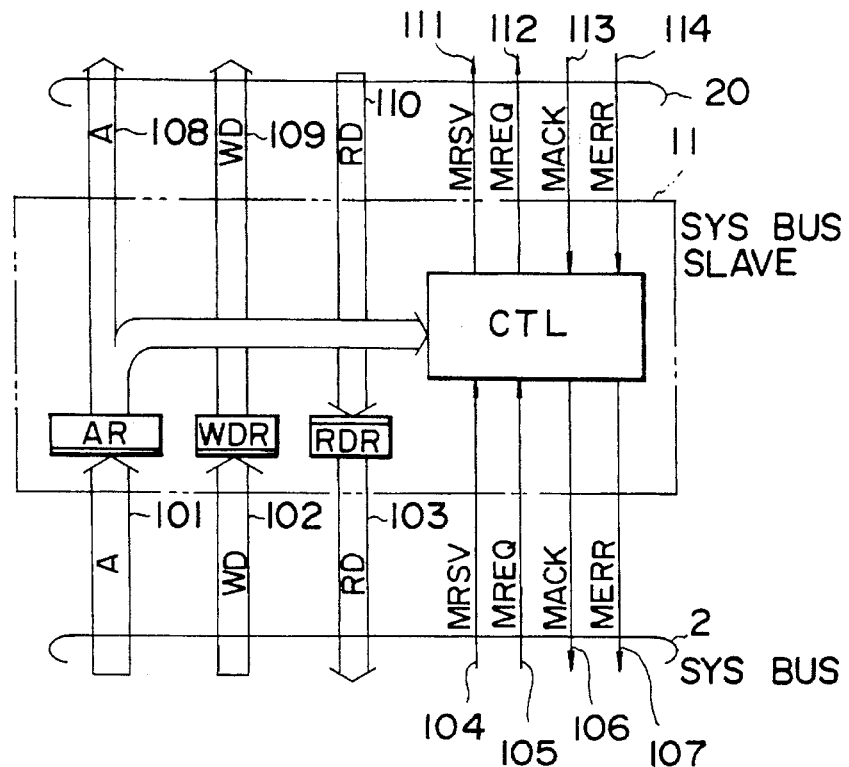
FIG. 4 (SYS BUS SLAVE)
FIG. 6 (OPERATION OF CONTROL SECTION 132)
| CONDITION | | | OPERATION |
|---|---|---|---|
| HIT (133) | RESERVE | WRITE/READ | DESTINATION OF ACCESS |
| 0 | × | × | COMMON MEMORY BUS |
| 1 | 0 | READ | SELF-CONTAINED COMMON MEMORY |
| 1 | 0 | WRITE | SELF-CONTAINED COMMON MEMORY AND COMMON MEMORY BUS |
| 1 | 1 | × | SELF-CONTAINED COMMON MEMORY AND COMMON MEMORY BUS |

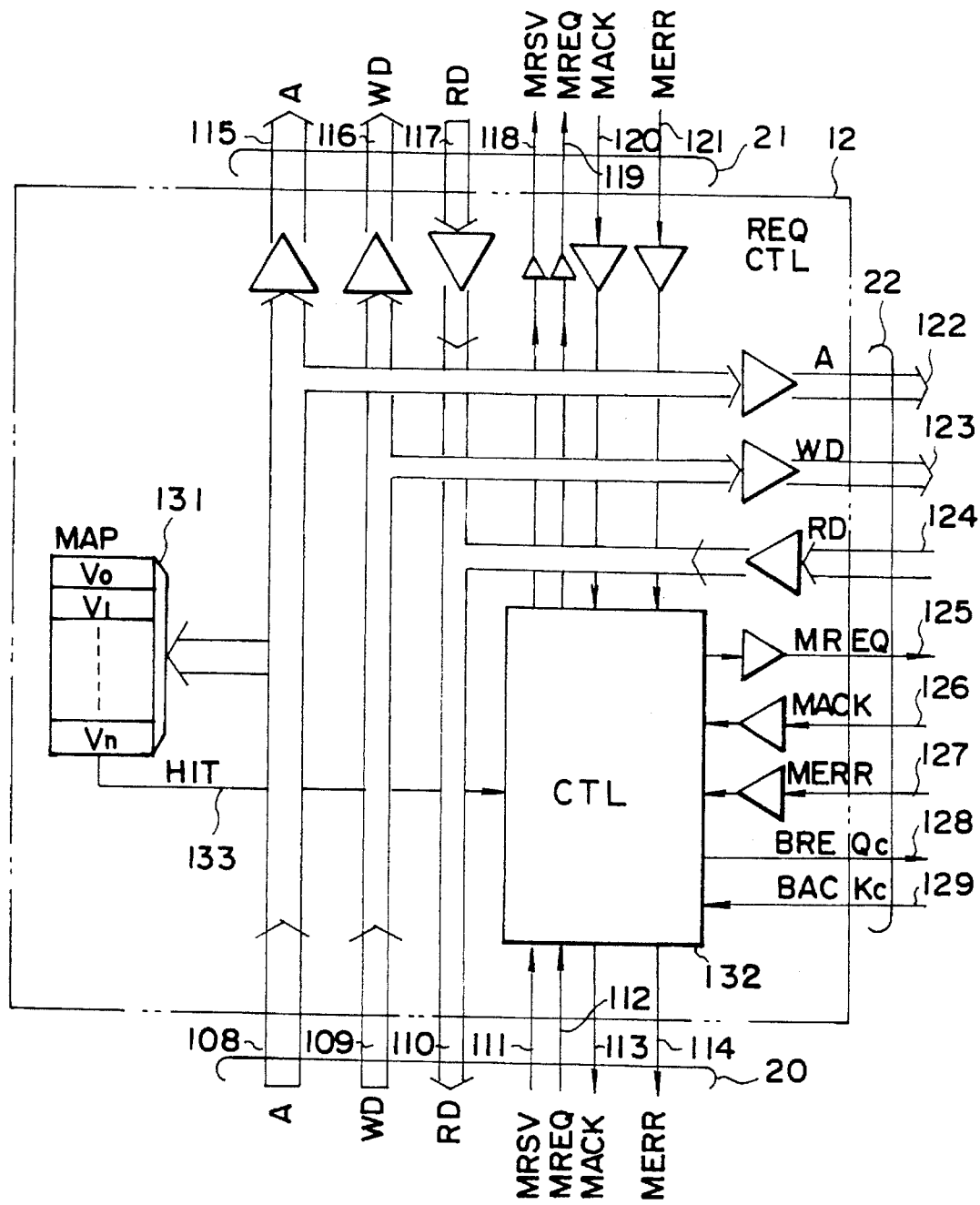
FIG. 5 (REQCTL)

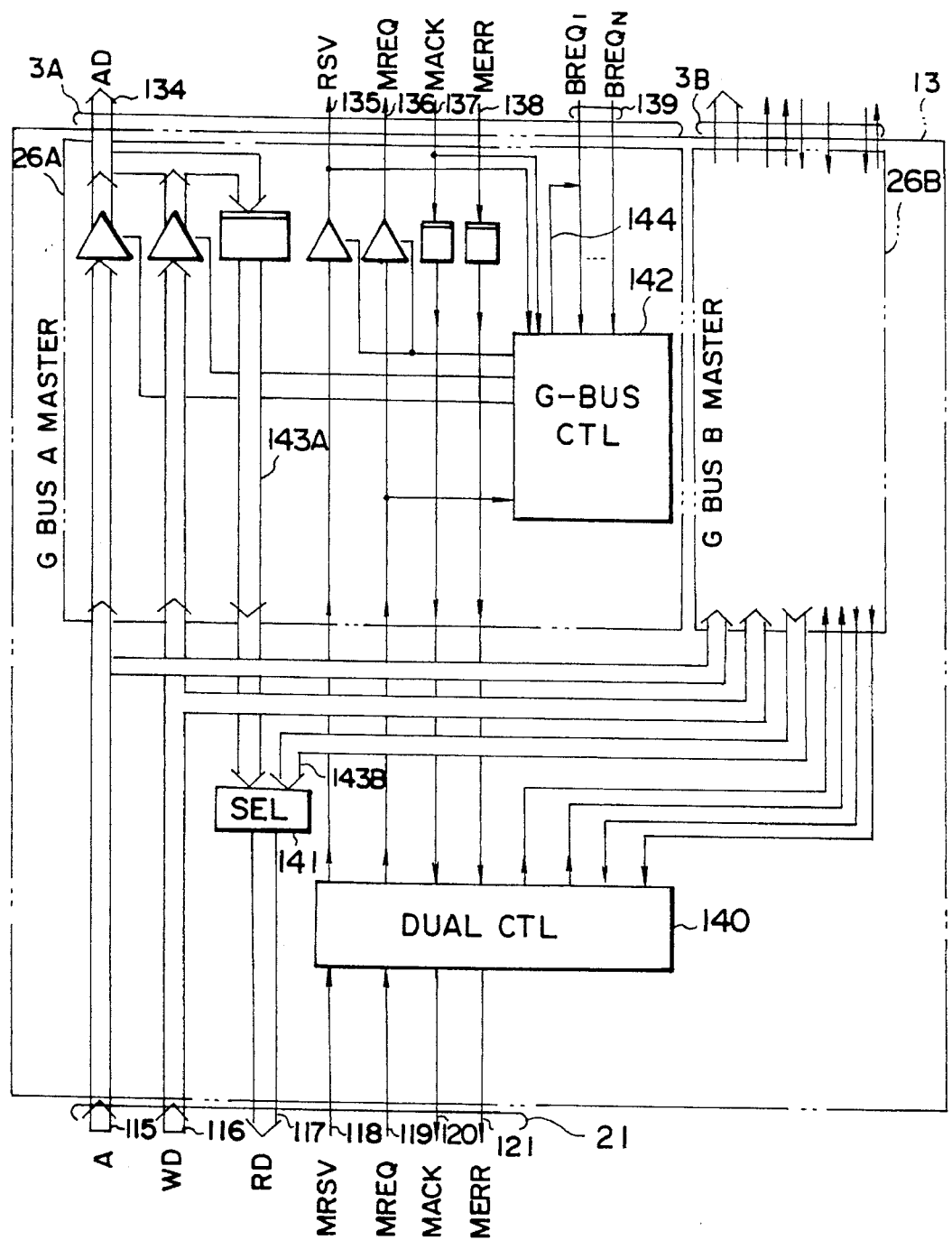
FIG. 7 (G-BUS MASTER)

FIG. 8 (NORMAL OPERATION)
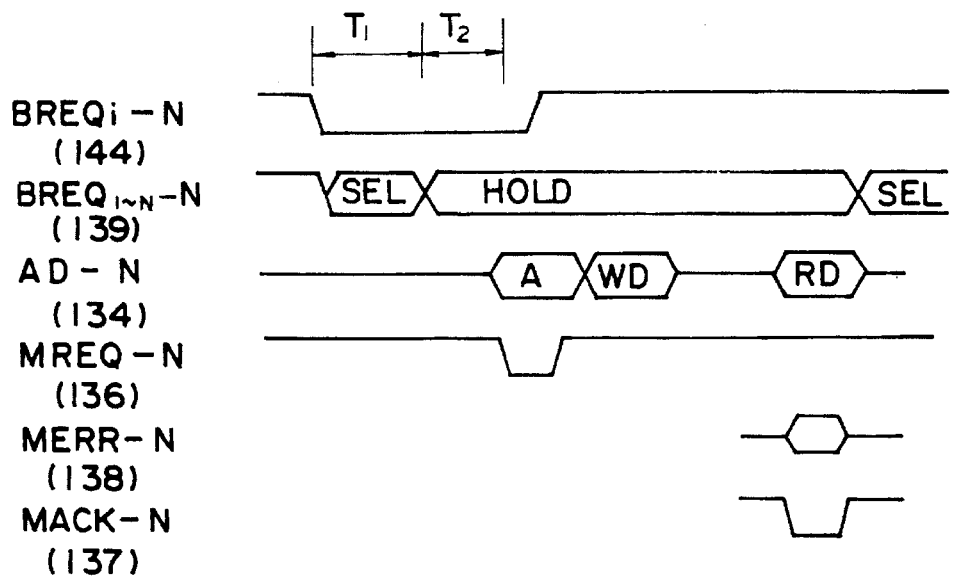
FIG. 9 (RESERVE ACCESS)
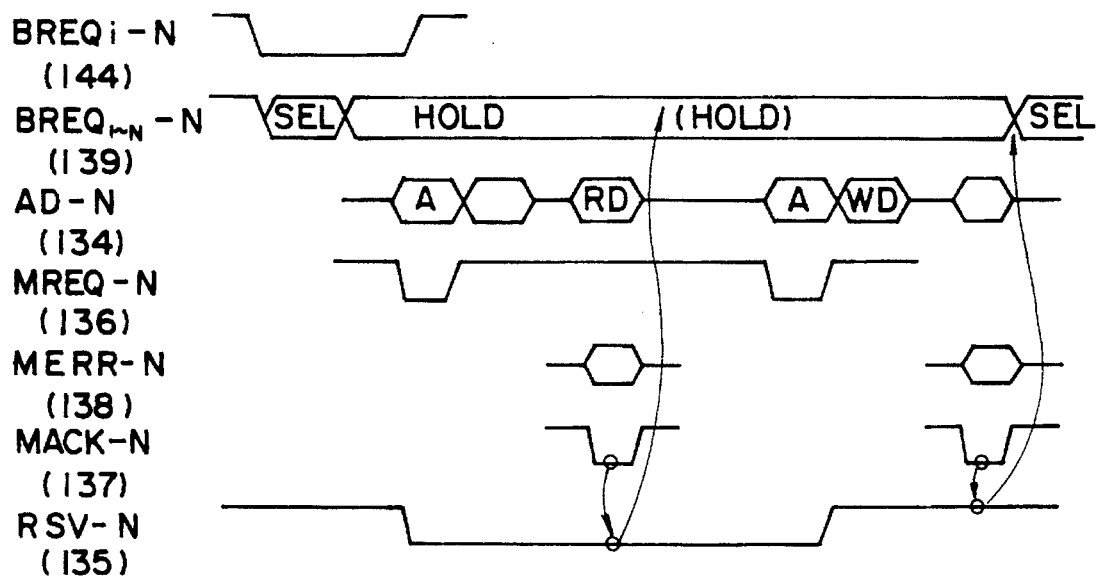

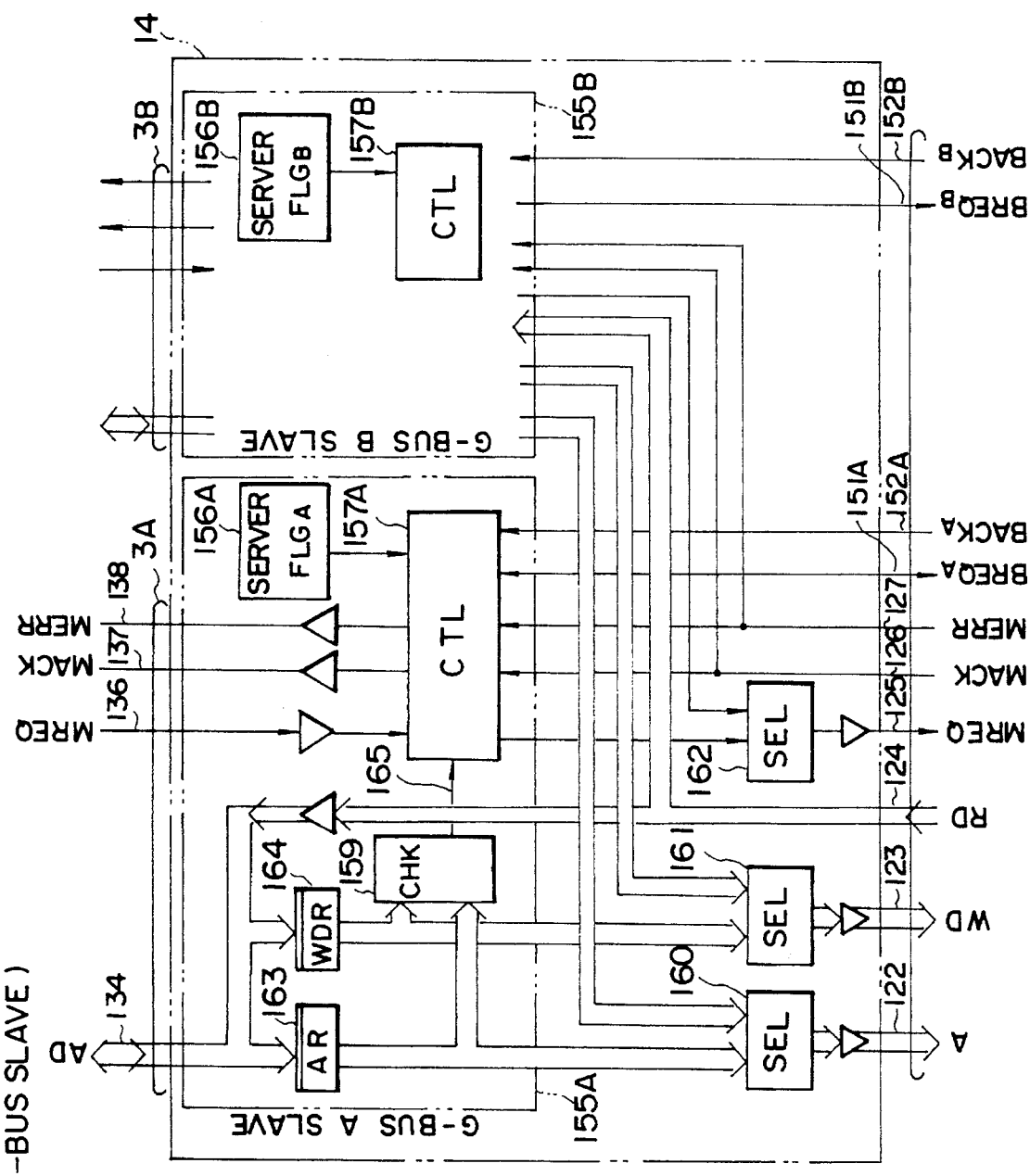
FIG.10 (G-BUS SLAVE)

FIG. 11 OPERATION OF CONTROL SECTION 157

| CONDITION | | | OPERATION | | |
|---|---|---|---|---|---|
| SERVER FLAG(156) | READ/WRITE | RECEIVING ERROR(156) | MACK(137) | MERR(138) | SELF-CONTAINED COMMON MEMORY |
| OFF | READ | OFF | OFF | OFF | NOT ACCESSED |
|  |  | ON | OFF | ON | NOT ACCESSED |
|  | WRITE | OFF | OFF | OFF | ACCESSED |
|  |  | ON | OFF | ON | NOT ACCESSED |
| ON | READ | OFF | ON | DEPENDS ON ERROR 127 | ACCESSED |
|  |  | ON | ON | ON | NOT ACCESSED |
|  | WRITE | OFF | ON | OFF | ACCESSED |
|  |  | ON | ON | ON | NOT ACCESSED |

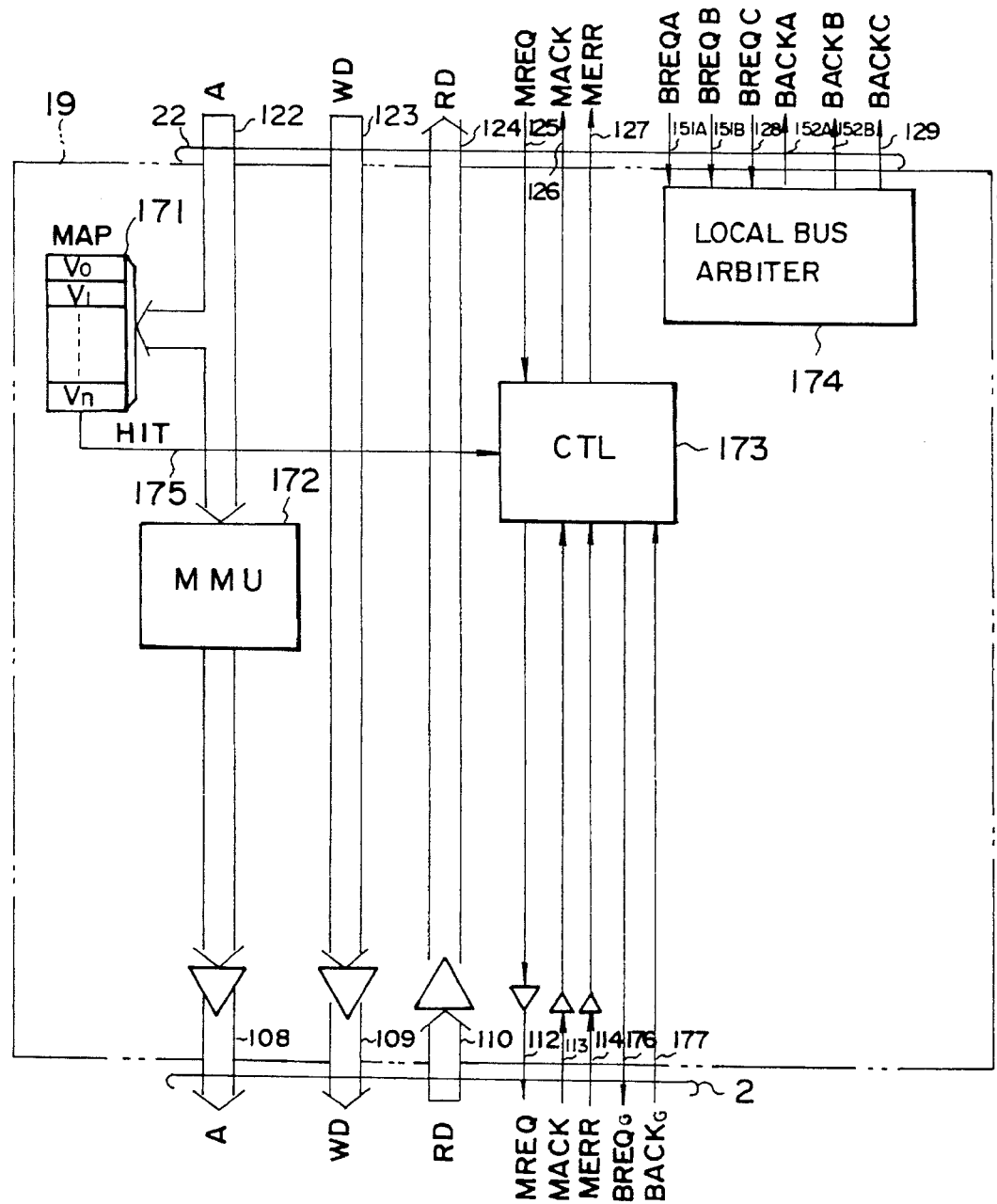
FIG. 13 (SYSBUS MASTER)

FIG. 14 (OPERATION OF CONTROL SECTION 173)

| CONDITION | | OPERATION | |
|---|---|---|---|
| HIT SIGNAL(175) | READ / WRITE | ACCESSABILITY OF SYSTEM BUS | ERROR SIGNAL 127 TO LOCAL BUS |
| 0 | READ | N/A | 1 |
|  | WRITE | N/A | 0 |
| 1 | READ | AVAILABLE | DEPENDS ON ERROR 114 FROM SYSTEM BUS |
|  | WRITE | AVAILABLE | 0 |

(CHANGING AREAS OF SELF-CONTAINED COMMON MEMORY)

FIG. 17 (COPY OF COMMON MEMORY)

METHOD FOR CONTROLLING MULTIPLE COMMON MEMORIES AND MULTIPLE COMMON MEMORY SYSTEM

This application is a continuation of application Ser. No. 585,234, filed on Sep. 20, 1990, now abandoned.

BACKGROUND OF THE INVENTION

1. Field of the Invention

The present invention relates to a system for controlling multiple common memories which are commonly owned and used by a plurality of processor units for improving reliability.

2. Description of the Prior Art

The basic arrangement of common memories is found in a dual common memory system, in which two memories are used in common by a plurality (N) of processing units, as shown in Japanese Patent Application Public Disclosure No.58-16362 (hereinafter referred to as "Prior Art 1").

On the other hand, an example of commonly using N common memories by N processing units is given in Japanese Patent Application Public Disclosure No.57-189257 (hereinafter referred to as "Prior Art 2"). These prior art structures have following drawbacks:

As for "Prior Art 1", it is likely that a plurality of processing units access each of the two common memories at a time, and, accordingly, each and every processing unit is compelled to wait for its turn for a relatively longer time, thereby causing a decrease of processing efficiency. Also, disadvantageously, the physical distance from each processing unit to the common memories will increase with the increase of the number of the processing units, and, accordingly, the time involved for accessing a selected common memory becomes much longer.

As for "Prior Art 2", each processing unit has its own common memory, and, accordingly, the cost of production will increase. If selected ones of all the processing units are front-end processors dedicated for inputting or outputting, or if selected processing units are of conventional types, it is difficult to provide each of such selected processing units with a common memory of the same capacity in view of cost, mounting space and compatibility or interchangeability.

As for a common memory addressing system, the same addresses are used in common among the plurality of processing units in Prior Art 1 and 2. Assume that it is desired that the function of a program is expanded. If the content of a selected table contained in the common memory should be increased, the addresses of the tables which follow the selected table must be shifted. Therefore, all CPUs (central processing units) must be stopped simultaneously, and the program of each and every CPU must be reconstructed. Therefore, the on-line (non-stop) expansion of the function is difficult in the system using common memories.

SUMMARY OF THE INVENTION

One object of the present invention is to provide a highly reliable, multiple common memory controlling system which is free of the above described drawbacks of prior art structures, which provide good performance, and which permits interconnections between CPUs of different types.

Another object of present invention is to provide a highly reliable, multiple common memory controlling system using an improved addressing system which is free of the above described drawbacks, and is capable of on-line expansion of the function.

According to an aspect of the present invention, there is provided a method for controlling multiple common memories in a multiple common memory system in which at least three central processing units (CPUs) share at least two common memories, each storing one and the same content, the method comprising the steps of: providing first and second CPUs of the at least three CPUs respectively with the at least two common memories such that each of the at least two CPUs contains one common memory therein; causing each of the first and second CPUs, when requesting a read access to a common memory, to access the common memory contained in itself; providing a third CPU of the at least three CPUs with no common memory; and causing the third CPU, when requesting a read access to a common memory, to access at least one of the common memories contained in the first and second CPUs.

According to another aspect of the present invention, there is provided a method for controlling multiple common memories in a multiple common memory system in which at least three central processing units (CPUs) share at least two common memories each storing one and the same content, the method comprising the steps of: providing first and second CPUs of the at least three CPUs respectively with the at least two common memories such that each of the at least two CPUs contains a common memory therein; causing each of the first and second CPUs, when requesting a read access to a common memory, to access the common memory contained in itself; providing a third CPU of the at least three CPUs with a third common memory to store data of a selected address region which data constitutes a part of the content of the common memories of the first and second CPUs; causing third CPU, when requesting a read access to the selected data, to access the third common memory; and causing the third CPU, when requesting a read access to data other than the selected data, to access at least one of the common memories contained in the first and second CPUs.

Writing access to a common memory is performed by accessing the corresponding addresses in all the common memories of said CPUs.

Preferably, said third CPU may have arrangement to renew the address region of its self-contained common memory and arrangement to copy a part of the data region corresponding to the renewed address region from the common memory of said first or second CPU and store it in the common memory of the third CPU.

A multiple common memory system in which a plurality of common memories are owned by a plurality of CPUs, is improved according to the present invention in that: the common memories are constituted by the physical memories contained in said CPUs, and each of the CPUs having the physical memories has an address translator for translating the common memory address that is common to all the CPUs into an address of the physical memory of the CPU.

Said address translator may serve to allocate the common memory to a part of the main memory space of the CPU, and permit the CPU to access the common memory via the address translator.

According to a third aspect of the present invention, there is provided a method of expanding common memories in a multiple common memory system in which a plurality of common memories are commonly owned by a plurality of CPUs, the method comprising the steps of: constituting the common memories by physical memories contained in some of the CPUs; providing virtual addresses for the common memories, the virtual addresses being common to all the CPUs; providing each of the CPUs, having the common memories therein, with an address translator for translating the virtual addresses into addresses of the physical memories of the CPUs; and disposing tables to be expanded with a space provided between the tables in a virtual address space of the common memory.

The method for expanding common memories may further comprise the steps of: preventing an access to the common memory contained in one of the CPUs; renewing address correspondence of the address translator for said common memory; and copying data associated with renewed address region of the common memory from the common memory of another CPU, which is in on-line operation, into the physical memory of the one CPU, thereby putting the same in on-line operation.

A multiple common memory system in which at least three CPUs share at least two common memories each storing one and the same content, is improved according to the present invention in that: each of first and second CPUs of the three CPUs contains a respective one of the two common memories, wherein each of the first and second CPUs has an arrangement responsive to a read request from a third CPU for sending the requested data to the third CPU; and the third CPU has an arrangement for requesting a read access to the common memory of the first or second CPU, and an arrangement for acquiring the data sent to the third CPU.

In the multiple common memory system the third CPU may be permitted to read out data from of both the common memories both of the first and second CPUs.

The third CPU may have data paths for reading out data from each of the first and second CPUs.

Each of the first and second CPUs may have an arrangement for selecting a data path for sending out data which is read out from the common memory of the first or second CPU.

The third CPU may have an address allocating an arrangement for allocating the address region of a part of the memories of the first and second CPUs to the common memory of the third CPU.

The address allocating an arrangement may permit the address region of a part of the common memory of the first and second CPUs to be programmably set.

In the specification and the claims the expression "self-contained" is intended to mean "contained within the same housing of the CPU". As for preferable "self-contained" configurations, a common memory may be mounted on the board on which a CPU is mounted, or may be mounted on a memory board which is connected to a mother board or the like.

According to the present invention, an uneven multiple common memory system can be realized in which the whole region of each common memory is at least duplicated, and partly triplicated or further multiplied.

A CPU having no whole region of the common memory can read out the necessary data from a CPU which has a whole region of the common memory. Therefore, there is no need for providing every CPU with a common memory of the same capacity. Even a CPU having no common memory is allowed to be connected with the system. Thus, there is flexibility in designing of performance and determining cost of production in view of balancing thereof.

During a read operation of a CPU, if data can be accessed by only addressing the address region of its self-contained common memory, read accessing to the self-contained common memory of the CPU can be effected in reduced period of time, thereby minimizing the concentration of reading operations for each common memory.

As regards a CPU which requires a quick read access to a common memory, it can contain the whole or a necessary part of the common memory, thereby minimizing the access time. Further depending upon the factors such as the mounting space available to common memories, costs of production, compatibility and the like, it may be possible that CPUs without common memories can also be included in the system.

According to the present invention another configuration may be made wherein all CPUs have common memory addresses, and at the time of accessing to the physical or real memories contained in these CPUs, the common memory addresses can be translated into the physical memory addresses. In other words, due to the fact that the common memory addresses which are common to all CPUs are virtual addresses, a wider range of virtual address area can be given to each table, and a portion of the table area which is actually used is assigned to the physical memory. Then the on-line expansion of the common memories will be permitted by expanding the physical memories sequentially for each of the multiplexed common memories and reestablishing setting of the address translators.

In addition, at least two CPUs, that is, the first and second CPUs, may be arranged to contain a whole region of the common memory, and the third CPU having no whole region of the common memory is allowed the access the whole region of the common memory in either of the first or second CPU. Therefore, even in case where there is some fault occurring in one of said whole region common memories, the other whole region common memory can be utilized thereby realizing the architecture of a higher reliability system.

BRIEF DESCRIPTION OF THE DRAWINGS

The preferred embodiments of the present invention will now be described in conjunction with the accompanying drawings in which:

FIG. 1 (b) shows a portion of the system, representing main elements of Global Memory Port(GMP) 1' shown in FIG. 1(a);

FIG. 4 is a block diagram showing an internal arrangement of a system bus slave interface within GMP;

FIG. 5 is a block diagram showing an internal arrangement of a request control section within GMP;

FIG. 6 shows a logic for determining destination of access for the control section;

FIG. 7 is a block diagram showing an internal arrangement of a master interface for the common memory bus within GMP;

FIG. 8 is a timing chart for the common memory bus;

FIG. 9 is a timing chart for the common memory bus in case of reserve access;

FIG. 10 is a block diagram showing an internal arrangement of a slave interface for the common memory bus within GMP;

FIG. 11 is a table representing operation of control section of the slave interface;

FIG. 13 is a block diagram showing an internal arrangement of a system bus master interface within GMP;

FIG. 14 is a table representing operation of control section of the master interface;

DESCRIPTION OF THE PREFERRED EMBODIMENTS

Figure 1A:
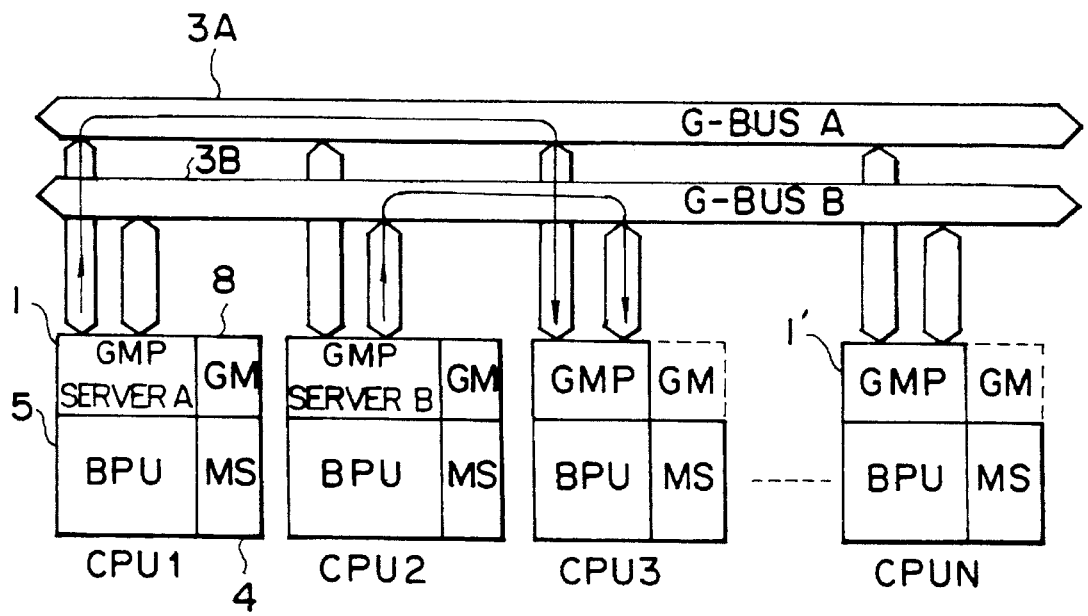
FIG. 1 (a) is a block diagram showing an entire configuration of a system according to the present invention.
Figure 1B:
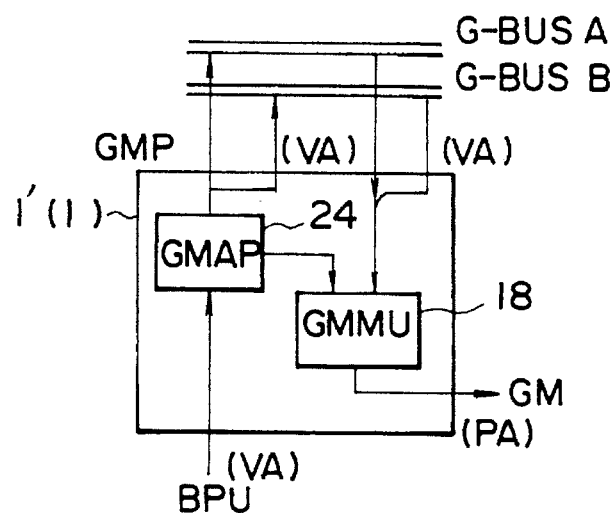

FIG. 1 (a) shows an entire configuration of a system according to the present invention, and FIG. 1 (b) shows main elements of GMP 1' of the system in FIG. 1(a).

A plurality of CPUs are interconnected via dual common memory buses, 3A and 3B (G-BUS A and G-BUS B). Each of the CPUs consists of a connection unit 1 (GMP: Global Memory Port) for connecting with the common memory buses; a distributed common memory 8 (GM:Global Memory) contained in each CPU; a Basic Processor Unit BPU 5; and a Main Storage MS 4. In principle, each GMP is arranged to perform a common memory read-out operation only from the GM contained in its CPU and to perform a common memory write operation to all GMs distributed in all CPUs via the dual G-BUSes.

The GMP of at least one CPU (in this example, CPU 1) having the whole region of the common memory is provided with an arrangement for sending GM read data to G-BUS A, and the GMP of at least one other CPU (in this example, CPU2) also having the whole region of the common memory is provided with means for sending GM read data to G-BUS B.

In addition, each of the GMPs of other CPUs is provided with a mapping arrangement (GMAP) 24, which functions as an address allocation for setting an address region of GM contained in its own CPU within the address region of the common memories of CPUs 1 and 2, and a read-out arrangement for reading data from CPUs 1 and 2, each of which has the read data sending arrangement, through the G-BUS if it is outside the address region of the GM. Furthermore, the GMP is provided with an address translator (GMMU: Global Memory Management Unit) 18 for translating addresses on G-BUSes which are common to all the CPUs (Common Virtual addresses) into the corresponding physical addresses of the GM contained in its own CPU.

The detailed description of the embodiments according to the present invention will now be made taking into account the arrangement thus far described.

Figure 2:
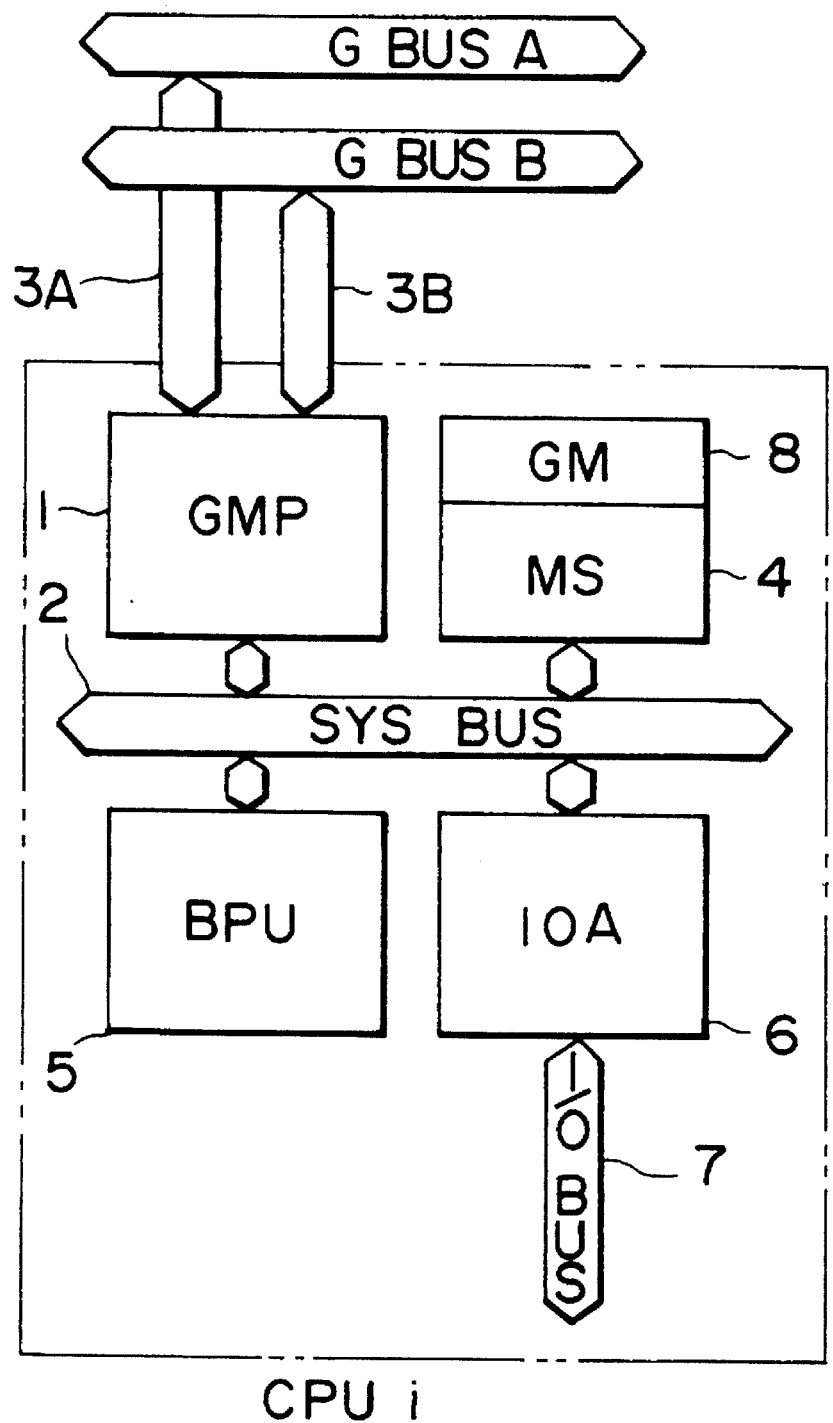
FIG. 2 is a block diagram showing an internal arrangement of each CPU shown in FIG. 1 (a)

Referring to FIG. 2 which shows an internal arrangement of a representative CPU, the common memory bus connection unit GMP 1, the main storage MS 4, the common memory GM 8, the basic processor unit BPU 5 and an input/output bus adapter IOA 6 are interconnected via a system bus SYSBUS 2. The GMP 1 is connected to the dual common buses 3A and 3B (G-BUSes A and B). The MS and GM may separately be mounted on different memory boards, but in this embodiment they are mounted on the same memory board and are distinguished as "MS" and "GM" depending on the addresses. (Of course, it is possible to mount GM within GMP.) The BPU, when accessing the common memory, issues a request (including address and write data) to GMP which then returns a response (including read-out data) to BPU after accessing GM in its own CPU via SYSBUS or accessing GM in other CPU via G-BUS.

Figure 3:
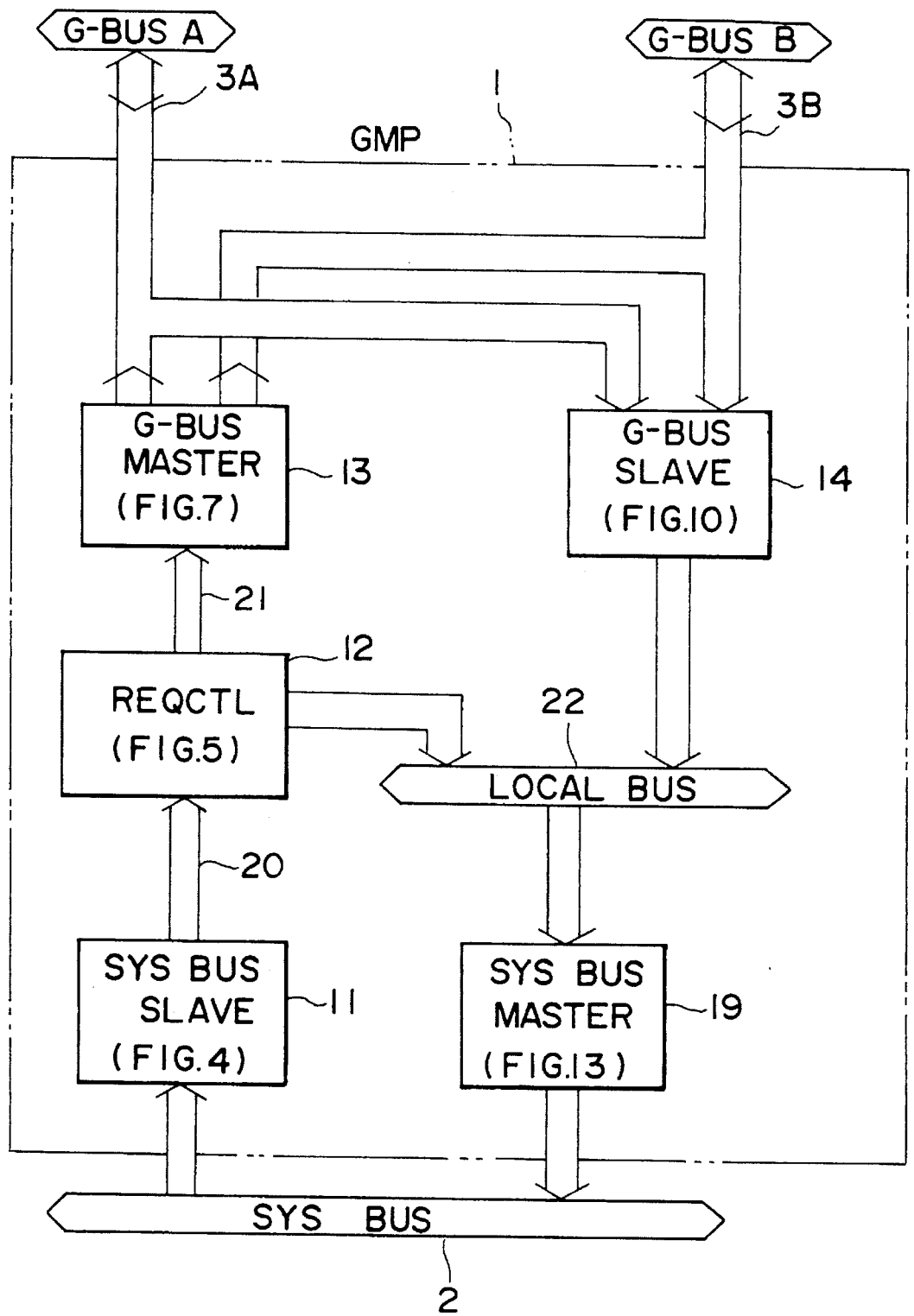
FIG. 3 is a block diagram showing an internal arrangement of bus connection mechanism GMP for a~ common memory.

FIG. 3 shows an internal arrangement of the common memory bus connection unit GMP 1. A system bus slave interface SYSBUS SLAVE 11 receives an access from the system bus 2. A request control REQCTL 12 checks the content of the access to determine the destination thereof. A common memory bus master interface G-BUS MASTER 13 receives the request from the request control 12 and supports the access to the dual common memory buses 3A and 3B. A common memory bus slave interface G-BUS SLAVE 14 receives an access from the common memory bus 3A or 3B and determines whether it is to be processed or not. A system bus master interface SYSBUS MASTER 19 receives a request for processing from the request control 12 or the common memory bus slave interface 14 via a local bus LOCAL BUS 22 and performs read/write operation to GM of its own CPU via the system bus 2.

FIG. 4 shows an internal arrangement,of the system bus slave interface 11 in the common memory connection unit GMP shown in FIG. 3. The system bus slave interface 11 receives request information (including an address (A) 101, write data (WD) 102, a request signal (MREQ) 105, and a reserve signal (MRSV) 104) from the system bus 2, accepts such information only when the address 101 is within the region that is allocated to the GMP, and sends out the request information (including an address 108, write data 109, a request signal 112 and a reserve signal 111) to the interface 20 of the request control 12. In addition, the system bus slave interface 11 receives the response information (including read-out data (RD) 110, a response signal (MACK) 113, and an error signal (MERR) 114) and sends out the response signal (including read-out data 103, a response signal 106 and an error signal 107) to the system bus 2.

FIG. 5 shows an internal arrangement of the request control 12 within the common memory connection unit GMP shown in FIG. 3. The request control 12 receives a request information from the interface 20 of the system bus slave interface 11, determines a destination of access according to the condition described hereinafter, sends out the request information to the interface 21, if the access to the common memory bus is to be made, or to the interface 22, if the access to the self-contained common memory is to be made, receives response information, and sends out the response information to the interface 20. A mapping unit MAP 131 constructed in accordance with one of the characteristics of the present invention indexes a map depending upon the address 108 and places the result in a hit signal 133. When the hit signal is at "1", it indicates that a portion of the common memory corresponding to the address exists on the self-contained common memory. On the other hand, when the hit signal 133 is at "0", it means that no portion of the common memory corresponding to the address exists on the common memory. The setting of the map is carried out under the system program of the CPU. The timing setting of the map can dynamically be made when the initialization of the CPU is carried out or otherwise in accordance with the transaction of the CPU.

FIG. 6 shows logic for determining the destination of an access which is effected by the control circuit 132 in the request control 12 shown in FIG. 5. When the hit signal is at '0', an access will be made to an external common memory via one of the common memory buses. When the hit signal is at '1' and a non-reserve access is to be made, the access will be made to the self-contained common memory. Further in order to assure the coherency, writing to the external common memory will also be made during the writing operation. When the hit signal is at '1' and a reserve access is to be made, a read/write operation and a reservation of the common memory will be performed, and an access will be made to both of the external common memories and the self-contained common memory.

FIG. 7 shows an internal arrangement of the common memory bus master interface 13 in the common memory connection mechanism GMP shown in FIG. 3. The bus master interface 13 receives request information from the interface 21 of the request control 12. A dual control DUAL CTL 140 in the bus master interface 13 accesses one common memory bus 3A via the interface 26A and, in case of normal response wherein the memory error signal 138 is at '0' and the memory response signal 137 is asserted, outputs the response information including the read data 143A to the interface 21. But in case of abnormal response wherein the memory error signal 138 is at '1' and the memory response signal 137 is asserted, an access will be made to the common memory bus 3B via the interface 26B. If the latter access is taken as the normal response, the dual control 140 outputs a normal response the signal 121 is at '0' and the signal 120 is asserted) to the interface 21. (At this time, a selector 141 selects the read data 143B.) But if the latter access is also taken as the abnormal response, the dual control 140 outputs an abnormal response (the signal 121 is at '1' and the signal 120 is asserted) to the interface 21.

The common memory bus control 142 serves to control an occupation and transfer on the common memory bus. A bus occupation request signal line 139 is provided for every CPU. An address/data (AD) signal line 134 is a bus on which an address, write data and read data are transferred in a time-divisional manner.

FIG. 8 is a timing chart showing occupation and transfer on the common memory bus. It is assumed that the bus occupation request BREQi of the CPUi is asserted. Then, after the time T1, each CPU enters the HOLD mode wherein it does not issue a new bus occupation request. After the time T2, a CPU, having the highest priority among the CPUs asserting the occupation request gains the occupation of the bus, sends an address on the 134 and asserts the request signal 136, thereby starting the transfer operation. When the response signal 137 is asserted, the transfer operation is terminated and the program proceeds to the subsequent control of bus occupation.

FIG. 9 is a timing chart showing occupation and transfer on the common memory bus in case of reserve access. The difference between the reserve access in FIG. 9 and the normal operation in FIG. 8 is such that due to asserting of the reserve signal 135, the bus occupation will be held at the time of response to the first time access (read access). But at the time of second access (write access), the program proceeds to the subsequent control of bus occupation due to negating of the reserve signal 135.

FIG. 10 shows an internal arrangement of the common memory bus slave interface 14 in the common memory connection unit GMP as shown in FIG. 3. An address on the address/data bus 134 of the common memory bus 3A is received in a register 163 and the write-in data is received in a register 164. The received information is checked by a check unit 159, and if any error has occurred, a received error signal 165 is asserted. A control section 157 (consisting of sections 157a and 157b) outputs the received information on a local bus 22 as the request information according to the condition as stated below, and outputs the response information from the local bus 22 on the common memory bus 3A also according to the condition as stated below. Selectors 160, 161 and 162 serve to select either one of the common memory buses A and 3B. Occupation of the local bus 22 is controlled by bus occupation request signals 151A/151B as well as bus occupation grant signals 152A/152B. Server flags 156A/156B arranged in accordance with one of the characteristics of the present invention are such flags that assign the slave interface 14 as the server of one of the common memory buses. The setting operation thereof is effected under the system program at the time of initialization. Otherwise, the setting may be fixed in hardware.

FIG. 11 shows an operation (more specifically the relationship with the server flags 156A and B) of control section 157 in the slave interface 14. In case of the non-server mode (the server flag=OFF), the response signal 137 (MACK) remains OFF. The error signal 138 (MERR) is asserted when the receive error signal 165 is ON. The error signal 138 (MERR) are arranged to be wired-OR on the common memory bus so that the wired-OR signal is asserted even when one error signal asserted is detected on the bus, In order to maintain the coherency, write access to the self-contained common memory will be made upon the writing operation. In case of the server mode (the server flag=ON), the response signal 137 (MACK) is asserted. In such server mode, the read access to the self-contained common memory is made to output the read data on the bus 134. For the write access, the same operation as that of the non-server mode will be made except for assertion of the response signal 137.

Figure 12:
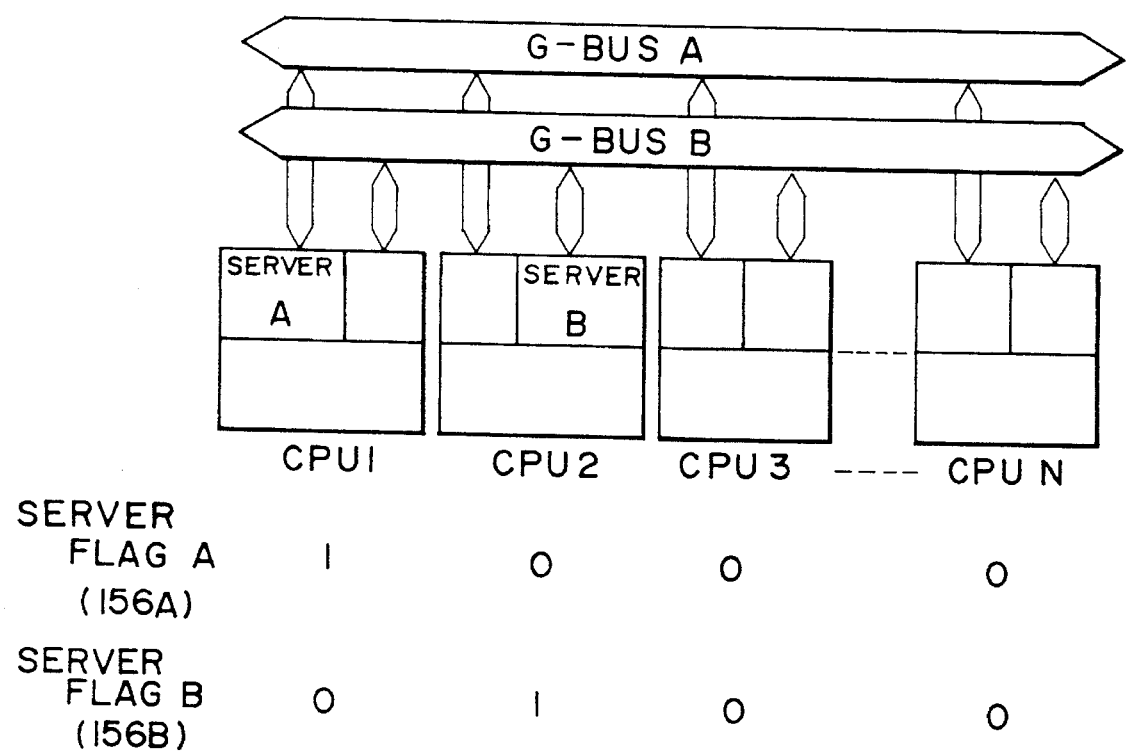
FIG. 12 is a diagram for explaining an example of setting of server flags in the slave interface.
Figure 15A:
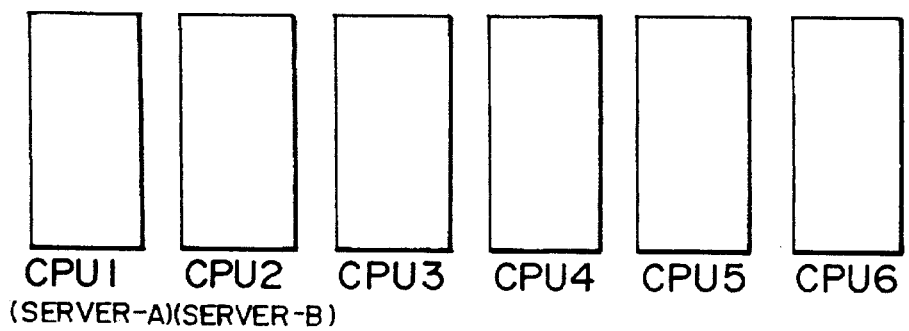
FIG. 15 is a diagram for showing examples of setting for a mapping unit within GMP.
Figure 15B:
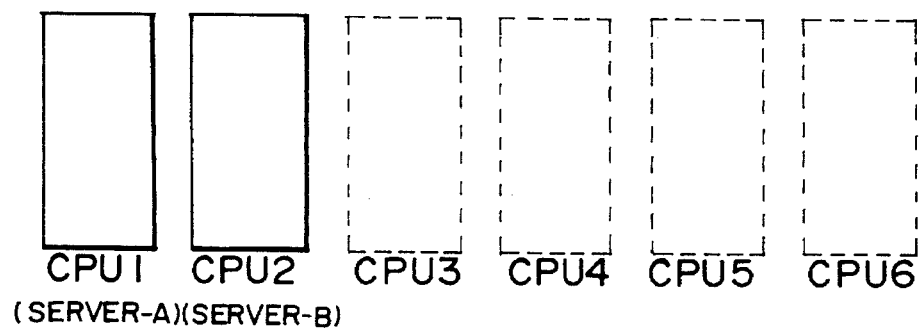
Figure 15C:
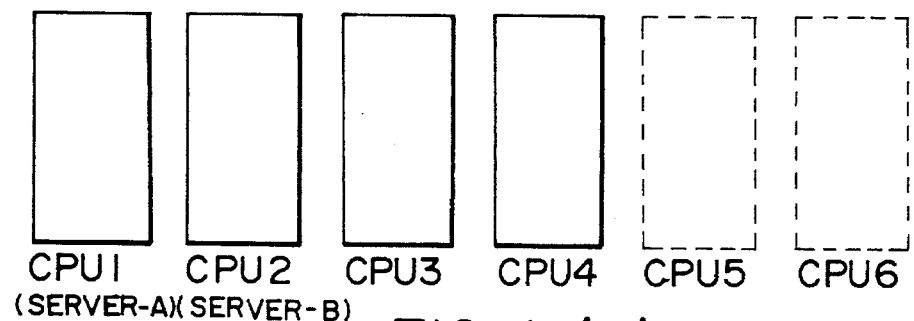
Figure 15D:
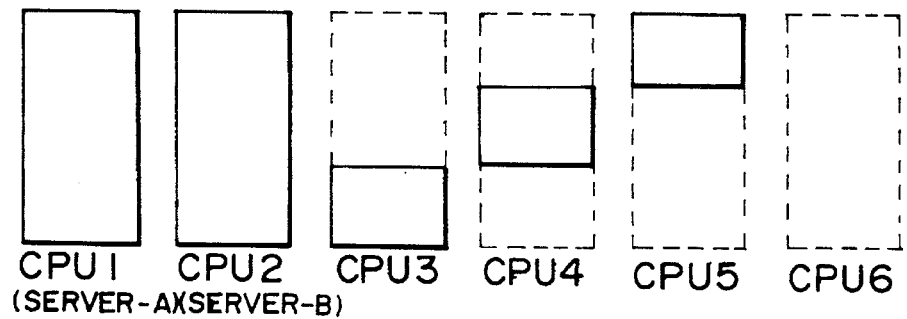

FIG. 12 shows an example of setting for the server flags 156 A and B. The setting rule is such that the server flag 156A of one of the common memory connection unit GMP in the system is ON, the server flag 156B of one of other common memory connection unit GMP is ON and all the remaining server flags are OFF. In other words, there is one server for each of buses A and B and the remainings are non-servers. For the system program, a fixed setting method is embodied wherein the number of CPU (which is set on the system file or on the switch mounted on the printed circuit board) is checked during power-up of the system, for example, and the setting of server flags is carried out accordingly. For example, the flag 156A is turned ON for CPU number 1 and the flag 156B is turned ON for CPU number 2. Alternatively, a semi-fixed setting method may be embodied as a modification thereof wherein the setting of server flags is effected depending on the order of the power-up of CPUs. In addition, another method of dynamically changing according to the variation of the transactions may also be embodied. Furthermore, an alternative method may be embodied wherein hardware fixed server flags are used instead of the writable flags, CPU 1 includes GMP with server function for bus A, CPU 2 includes GMP with server function for bus B, and CPUs 3 through N include GMPs with no server function. In any of the cases stated above, it is desirable that the CPU including GMP as the server has the whole region of common memory.

FIG. 13 shows the internal arrangement of the system bus master interface 19 in the common memory connection mechanism GMP as shown in FIG. 3. A local bus arbiter 174 makes a decision as to which occupation request 151A, 151B or 128 of the local bus has the highest priority, and, according to the result of decision, asserts one of the occupation grant signals 152A, 152B and 129 on the local bus. A mapping unit 171 constructed in accordance with one of the characteristics of the present invention makes a decision regarding the address 122 on the local bus, refers to the map based upon the address and places the content thereof in the hit signal 175. When the hit signal 175 is at '1', it indicates that the common memory corresponding to that address exists in its self-contained common memory. When the hit signal 175 is at '0', the common memory corresponding to that address does not exist in its self-contained common memory. The mapping unit 171 has the same functions the same setting method, and the same setting timing of the map as that of the mapping unit 131 contained in the request control 12 as shown in FIG. 5. Although the CPUs with or without a whole region of common memory may not necessarily have the mapping unit 131 or 171 (because of always 'hit' or 'mis-hit'), it is preferable that they include such mapping units in view of the flexibility.

The address 122 is entered into a memory management unit (MMU) 172 where address translation is effected. After translation, the address is output as address 108 on the CPU system bus 2 which is used at the time of accessing the self-contained common memory. A control section 173 serves to receive the request from the local bus 22, to make a decision of the acceptability of access to the system bus 2 according to the condition asserted below, and to access the system bus 2 when it is accepted, thereby returning the final response onto the local bus 22.

FIG. 14 shows the condition for determining the acceptability of access to the system bus 2 of the control section 173 in the master Interface 19. Under the condition as indicated, when the hit signal 175 is at '0', the access to the system bus 2 is not effected but the response is immediately returned. When the hit signal 175 is at '1', the access to the system bus 2 is effected and then the response is returned to the local bus 22 after receiving the response from the system bus 2.

FIG. 15 shows examples of setting for GMP mapping units 131 (FIG. 5) and 171 (FIG. 13). Example (a) in FIG. 15 represents the case in which all the CPUs have whole areas of common memories that corresponds to "Prior Art 2" as described earlier. Example (b) in FIG. 15 represents the case in which two CPUs have whole areas of common memories, but remaining CPUs have no common memories, that is similar to "Prior Art 1" as stated earlier. However, the arrangement in the present invention has an advantage in that a reduced reading time is achieved as compared to "Prior Art 1" because of the fact that the read-out operation is always made to the common memory fixedly included in a CPU, more specifically the self-contained common memory of each CPU. Example (c) in FIG. 15 represents the case in which four CPUs have whole areas of common memories in order to perform high speed processing while the remaining two CPUs have no common memories but can utilize one of the common memories of CPUs 1 and 2. The arrangement of Example (c) is suitable for such circumstance that the CPUs 5 and 6 are dedicated for input/output functions only and as a consequence the cost performance may be degraded if they have the self-contained common memories, or that the CPUs 5 and 6 can not include the self-contained common memories due to the different types of CPUs. Example (d) in FIG. 15 represents the case in which the CPUs 1 and 2 have whole areas of common memories while the remaining CPUs have a portion of the common memory at an area required for high speed read-out in view of specific transactions involved with the self-contained memory area and have no common memory at another area to which data is readout from the common memory of CPU 1 or 2. The setting described above can dynamically be changed depending upon the transactions involved, but it requires the following sequence of steps.

Figure 16:
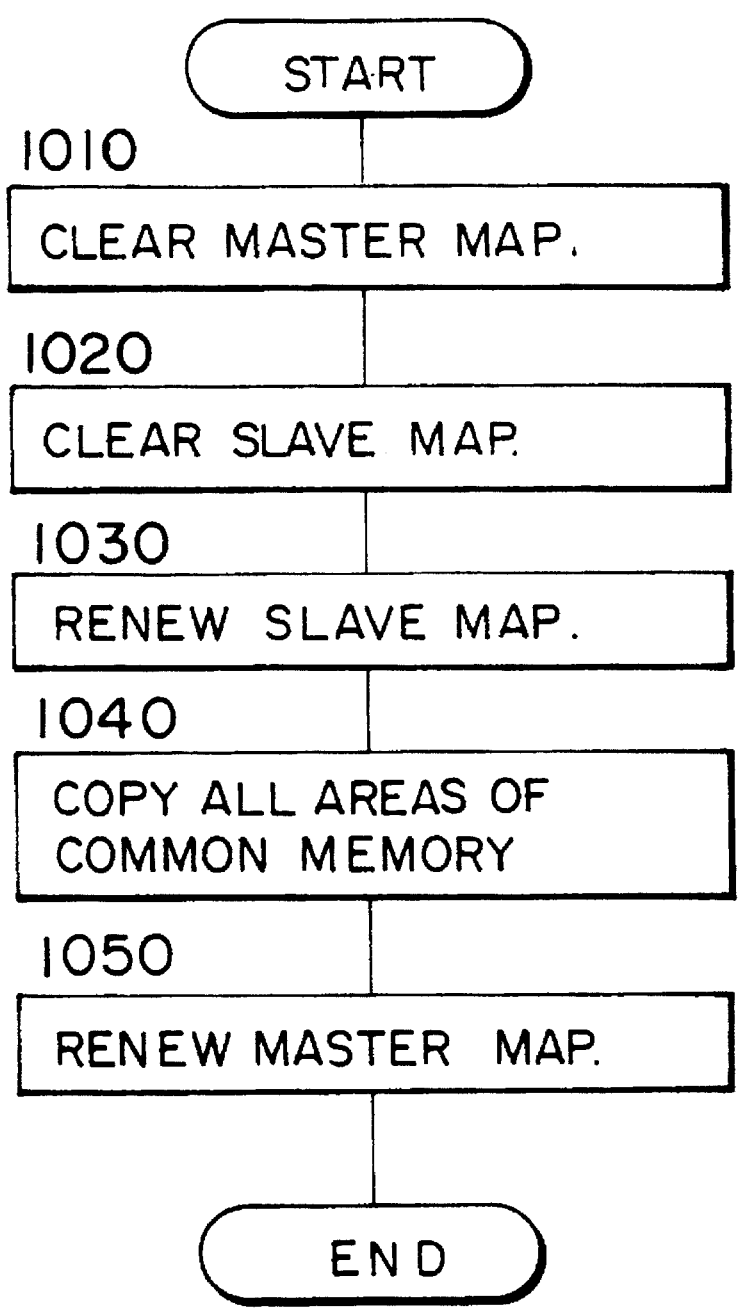
FIG. 16 is a flow chart showing a sequence of system program steps when changing an area of the self-contained common memory.

FIG. 16 shows a system program having several steps for dynamically changing the areas of the self-contained common memory. After the 'START' step, the program proceeds to step 1010 wherein the master map (mapping unit 131) is cleared. Thereafter, the CPU program does not refer to the self-contained common memory thereof. Then in step 1020, the slave map (mapping unit 171) is cleared, thereby completely isolating the self-contained common memory from the common memory bus. Then in step 1030, setting of the slave map is renewed, thereby re-connecting the self-contained common memory with the common memory bus. The program proceeds to step 1040 wherein the coping of the whole area of the common memory or its address region newly established is effected so that the contents of the self-contained common memory becomes incident with those of the common memory of the server CPU. Thereafter in step 1050, setting of the master map is renewed in order that the CPU program can use the self-contained common memory.

Figure 17:
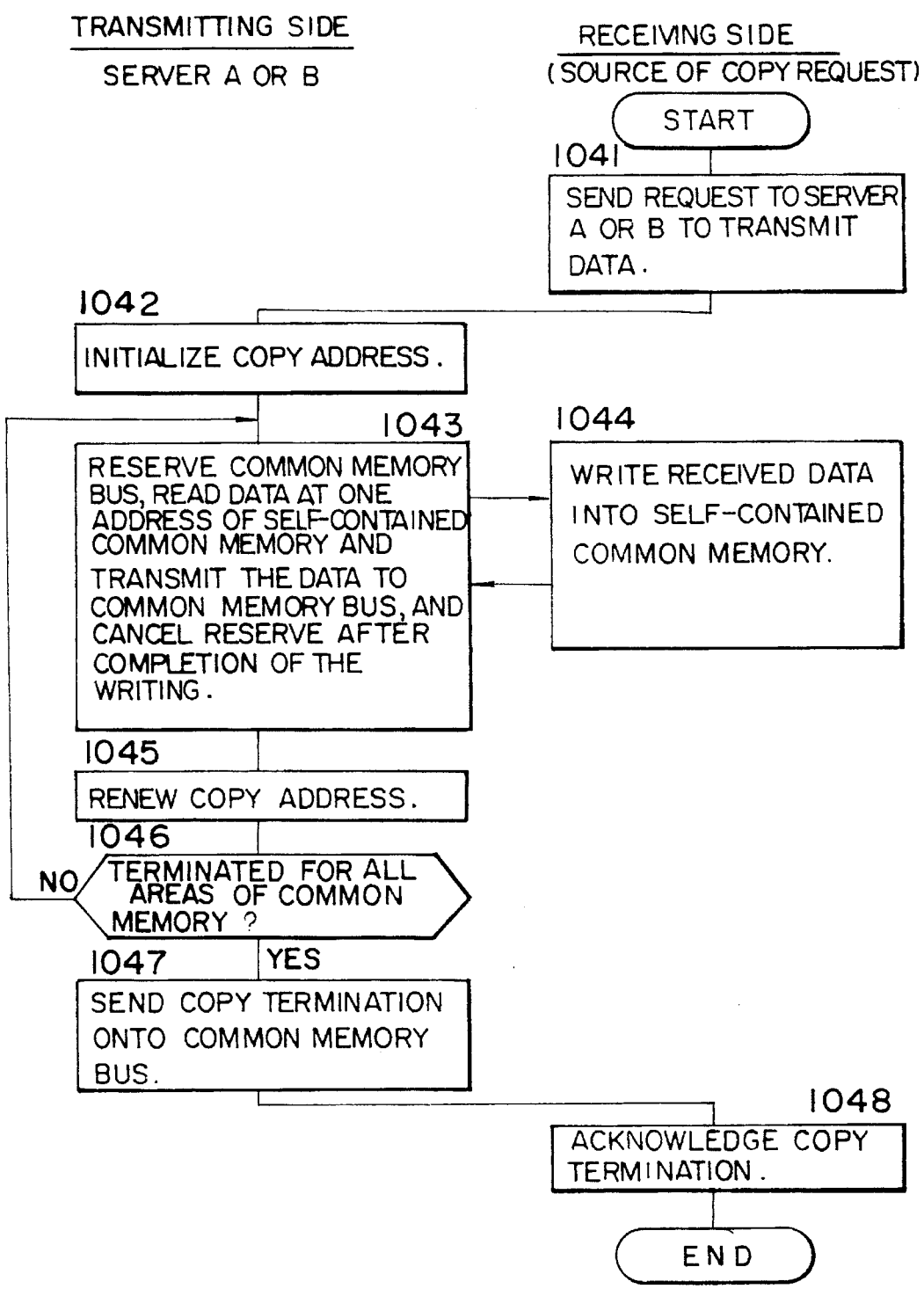
FIG. 17 is a flow chart showing a sequence of copying of the common memory.

FIG. 17 shows a sequence of steps for copying the content of the common memory. The program begins at 'START' step and proceeds to step 1041 wherein a copy requesting side (copy receiving side) issues a sending request for copy to the CPU of the server A (or B) via the common memory bus 3A (or 3B). The server CPU receiving the request performs initialization of the copy address (step 1042), reserves the common memory bus, reads-out one data at an address of the self-contained common memory and outputs the data onto the common memory bus (step 1043). Then at the receiving side, writing of the received data is effected to the self-contained common memory (step 1044). Thereafter, the copy address is updated (step 1045) and the same steps 1043 through 1045 are repeatedly carried out until the copy of the whole area of the common memory is completed (step 1046). After completion of the copying, a copy completion signal is sent to the common memory bus (step 1047) and the receiving side acknowledges the completion of the copying (step 1048). In this way, the content of the whole area of the common memory is sequentially copied. It is to be noted that if an attempt for normal access is made during the copying operation, no incoherence can occur due to the way that reservation of the common memory bus is effected every time one copying access is made. Furthermore, the reservation of the common memory bus is released at the time of every completion of copying access so that the normal access operation waits for only a short interval of time. If it is desired that a portion of the whole area of the common memory is copied, the sending side performs the operation for sending the data of of whole area of the common memory, but the receiving side only receives and writes the data of the associated addresses to its self-contained common memory. Alternatively, the sending side may be arranged to send only the data of a portion of the whole area.

Figure 18:
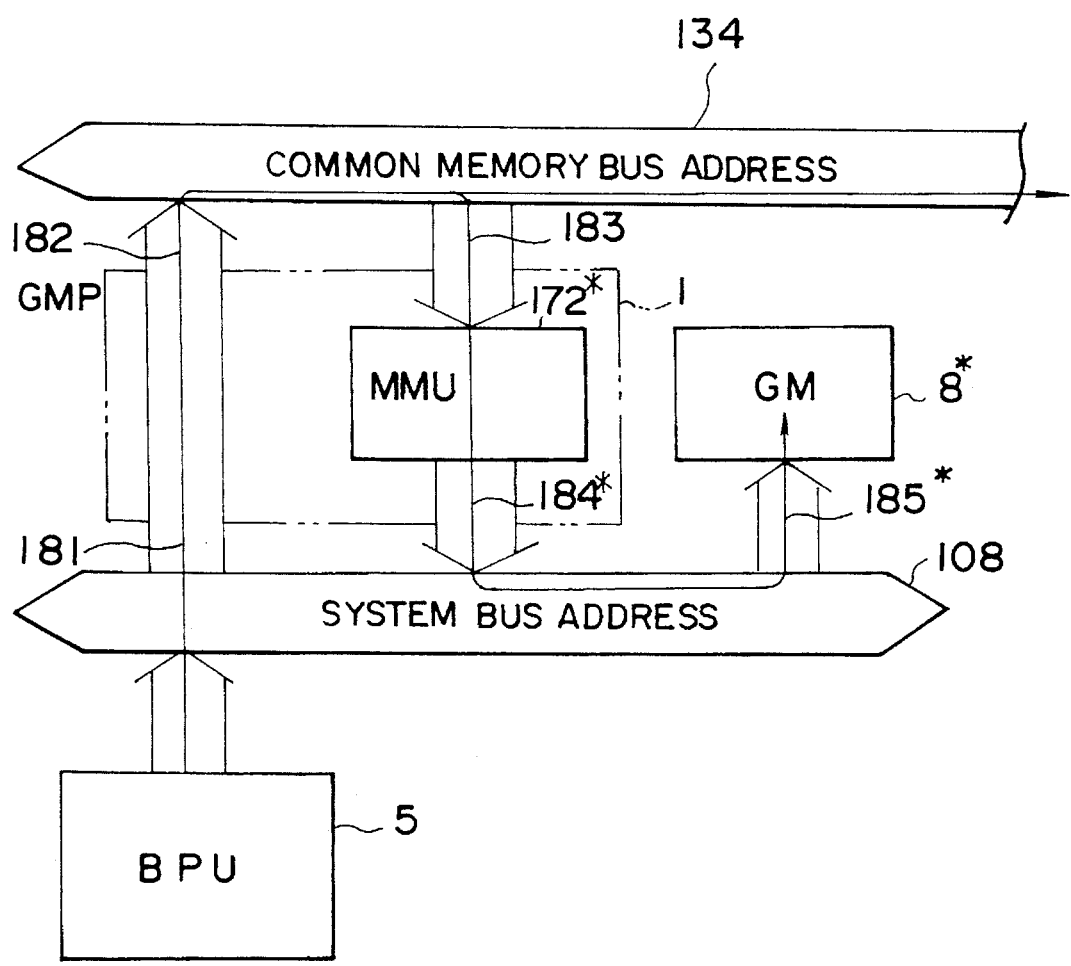
FIGS. 18 and 19 are diagrams for explaining a concept of memory management unit within GMP.
Figure 19:
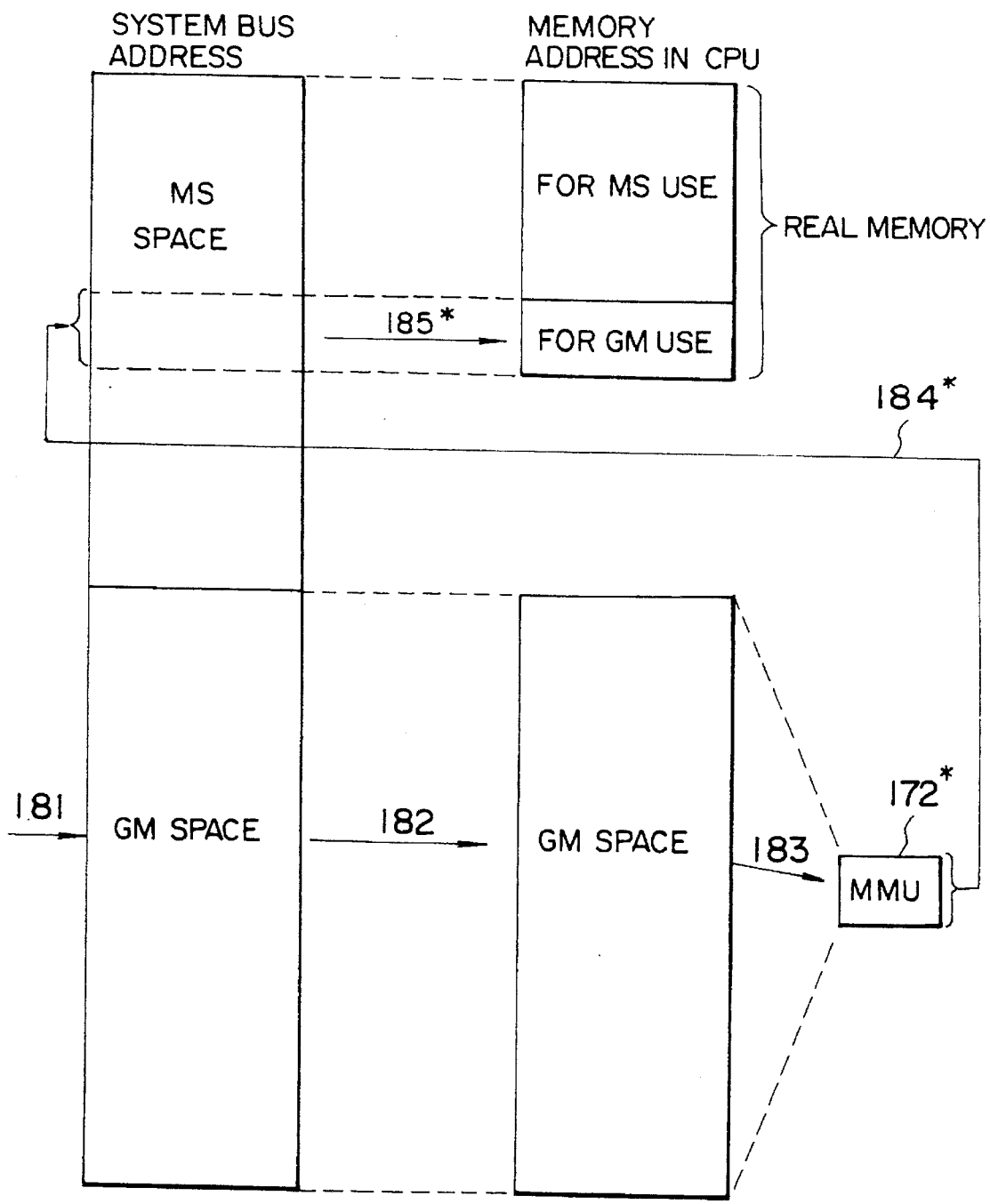

Referring now to FIGS. 18 and 19, the concept of address translation in the memory management unit 172 (FIG. 13) of a GMP will be described. The address 181 that the common memory connection unit (GMP) has received from the system bus becomes the common memory bus address 182 without any change. The common memory address is translated by the memory management unit 172*. The translated address 184* is the system bus address that corresponds to the address 185* of the self-contained common memory of the CPU. Each of elements with an asterisk mark (*) is independent for each of the multiple common memories. In other words, the common memory bus address is common to all the multiple common memories, but the memory management units 172 are provided for every one of the multiple common memories, thereby producing the physical memory address. This is one of the characteristics of the present invention by which it is possible to use the common memory as a virtual address that is utilized by each CPU program and to make the independent setting of the correspondence to the physical memory for each of the multiple memories, thereby enabling the on-line expansion of function.

Figure 20:
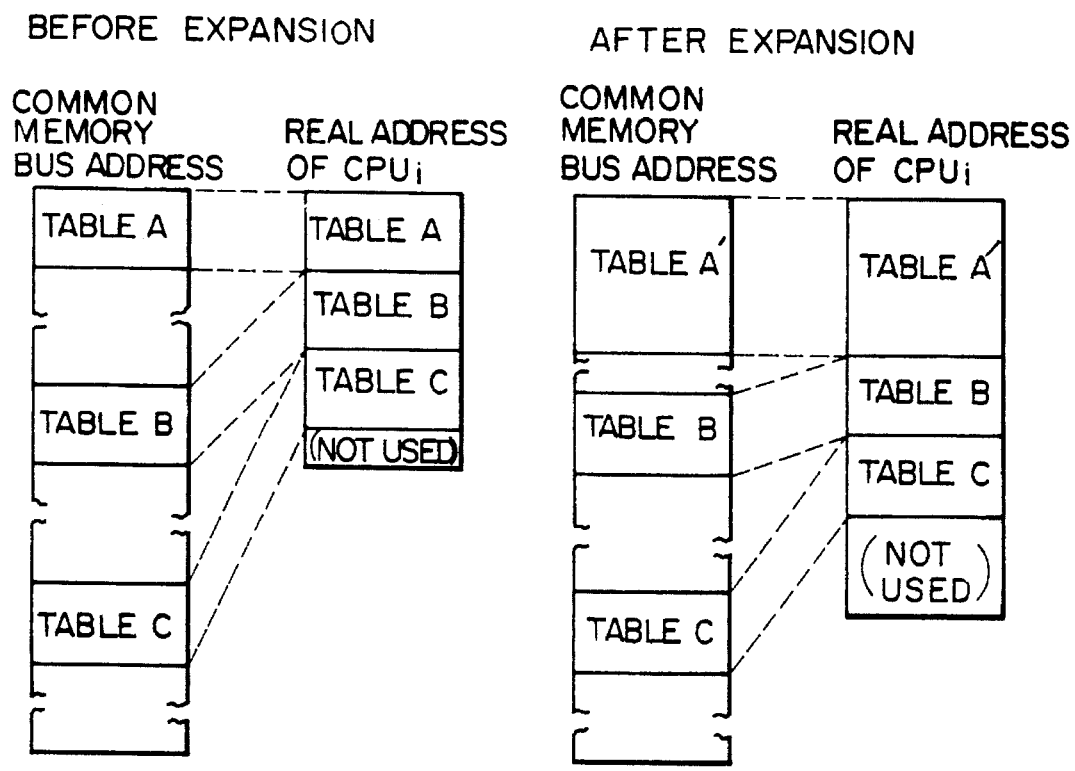
FIG. 20 is a diagram for explaining correspondence of addresses before and after the address translation at the time of on-line expansion.

FIG. 20 shows results of the address translation before and after the on-line expansion. Referring to this figure, the tables A, B and C are located with sufficient spacing therebetween on the common memory bus address or virtual address for the sake of future expansion, but are located with no spacing therebetween on the physical memory by way of the address translation function.

Assuming that it is desired to expand the table A by some reasons such as increase of number of the input/output devices to be supported and the like, the on-line operation of CPUi is terminated, and, thereafter, an additional memory board is mounted, the table A is expanded to form table A' and the correspondence of address translation is reestablished. Then the content of the common memory of another CPU that is running under an on-line condition is copied to new address areas of the expanded common memory, thereby putting it into on-line operation. The addresses transferred between CPUs during copying operation are the virtual addresses that are common to all the CPUs. Although the addresses of the tables B and C are actually changed on the basis of physical address, the common addresses for other CPUs are kept unchanged so that they can continue to execute the processing of the program. Then the correspondence of the address translation for other CPUs is sequentially reestablished and the content of the table A' is copied from the common memory of the CPUi. In this way, such expansion is repeated for all the multiple common memories. After expansion of all the common memories, the expanded table A' is used to sequentially load the CPUs with the program functionally expanded. Thus, on-line expansion of the multiple common memories can be achieved.

In view of the teachings as stated above, an alternative arrangement may be embodied within the scope of the present invention in which the common memory buses G-BUS consist of cables that are contained within the housing of the bus unit or they are made of conductors on the printed circuit board in the bus unit. Furthermore, although in the embodiment as stated above the transmission lines were in the form of buses, other types of the transmission lines such as ring type, one-to-one connection type and the like may be adopted. In addition, the mapping unit 131 may be fixedly established by hardware if there is no need for modifications.

Thus, it is apparent from the foregoing description that according to the present invention an improved multiple common memory system has been provided wherein there is no need for all CPUs to include the same capacity of common memories. It also is optimized for balance of the cost and the performance, and is excellent in compatibility. Further, in the multiple common memory system according to the present invention, virtual addressing is realized for common memory addresses that are common to all the CPUs, and the correspondence to the physical memories can independently be reestablished for each of the physical memories, thereby enabling the on-line (non-stop) expansion.

We claim:

1. A multiple common memory system comprising:

a first CPU which has a first common memory to be shared with a third CPU; and a second CPU which has a second common memory to be shared with said third CPU, wherein said third CPU includes means for accessing either the first or second common memory, wherein each of the first and second CPUs includes means responsive to a read request from the third CPU for sending out requested data to the third CPU, and wherein the third CPU includes means for issuing the read request to one of the first and second CPUs to access the respective first and second common memories therein and means for receiving the requested data sent therefrom to the third CPU, and wherein the third CPU has two data paths each connected to both the first and second CPUs for selectively receiving, through either of the two data paths, data sent from the first or second common memory to the third CPU.

2. A multiple common memory system according to claim 1, wherein each of the first and second CPUs has means for selecting one of said two paths for sending out data which is read out by the third CPU from the common memories of the first or second first or second CPU.

3. A multiple common memory system according to claim 1, wherein said first and second common memories have identical storage capacities and store identical data.

4. A multiple common memory system comprising:

a first CPU which has a first common memory to be shared with a third CPU; and a second CPU which has a second common memory to be shared with said third CPU, wherein said third CPU includes means for accessing either the first or second common memory, wherein each of the first and second CPUs includes means responsive to a read request from the third CPU for sending out requested data to the third CPU, and wherein the third CPU includes means for issuing the read request to one of the first and second CPUs to access the respective first and second common memories therein and means for receiving the requested data sent therefrom to the third CPU, and wherein the third CPU includes means to read out data selectively from either of the common memories of the first and second CPUs, and wherein the third CPU has two data paths each connected to both the first and second CPUs for selectively receiving, through either the two data paths, data sent from the first or second common memory to the third CPU.

5. A multiple common memory system according to claim 4, wherein each of the first and second CPUs has means for selecting one of said two paths for sending out data which is read out by the third CPU from the first or second common memories of the first or second CPU.

6. A multiple common memory system according to claim 4, wherein said first and second common memories have identical storage capacities and store identical data.

* * * * *